Dec. 2, 1958     P. STEINHAUSER     2,862,327
FISH HOOK REMOVER
Filed March 26, 1957
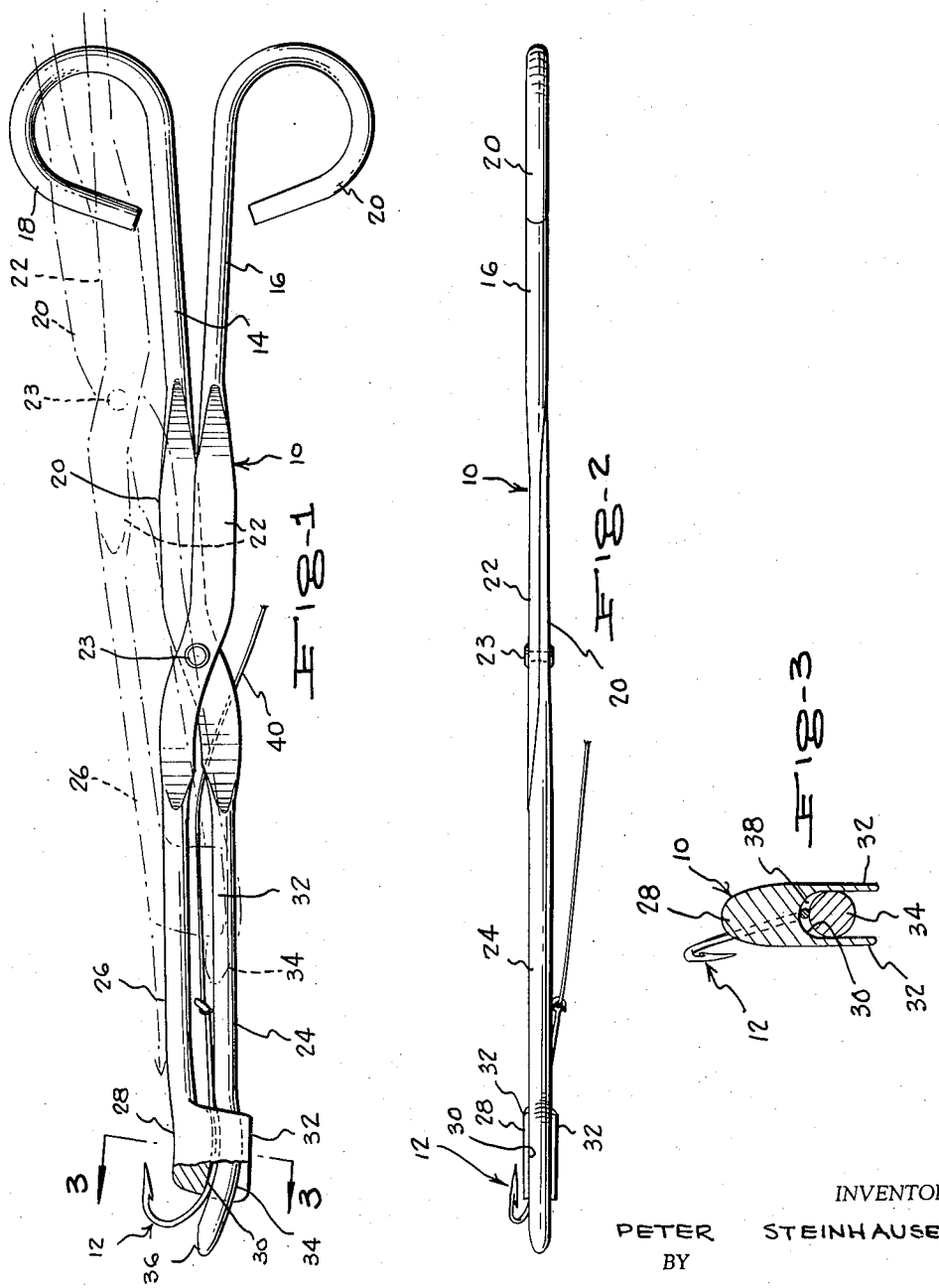
INVENTOR.
PETER STEINHAUSER
BY
McMorrow, Berman & Davidson
ATTORNEYS 2,862,327

FISH HOOK REMOVER

Peter Steinhauser, Brooklyn, N. Y.

Application March 26, 1957, Serial No. 648,718

1 Claim. (Cl. 43—53.5)

This invention relates to a fish hook remover or extractor, falling within the general class of devices employed for the purpose of dislodging a fish hook from the mouth of the fish.

It is well appreciated that in many instances, it is extremely difficult to extract a fish hook from the mouth of the fish after the fish is caught. For example, the hook may be embedded a substantial distance inwardly from the fish's mouth, and can in actuality be swallowed when the fish takes the bait. In other cases, the tissues of a particular fish may be tough, so as to render difficult the task of extracting the fish hook.

Previously, the fish hook extractors have been conceived, and the main object of the present invention is to provide a device of this type which, by reason of its novel construction, will generally improve upon devices previously conceived for the same end purpose.

Another object is to provide a fish hook extractor that will be particularly designed for manufacture at a very low cost, considering the efficiency thereof and its adaptability for removing hooks even when they are deeply embedded.

Another object is to facilitate guiding of the device directly to the location at which the hook is embedded.

A further object is to facilitate gripping of the hook, at the mentioned location, in a manner to ensure a firm hold upon the hook and easy and effective manipulation of the hook in any desired direction needed for the purpose of extracting the same.

Another object is to extract the hook without damaging the same.

Still another object is to permit extraction of hooks of different sizes and types.

A further object is to effect guiding of the device to the fish hook, clamping of the device to the hook, and manipulation of the hook for the purpose of extracting the same, while still leaving one hand free for holding the fish.

Still another object is to design the desice so that it can be manufactured at low cost, from any of various materials while still providing a rugged, trouble-free construction.

Other objects will appear from the following description, the claims appended thereto, and from the annexed drawing, in which like reference characters designate like parts throughout the several views, and wherein:

Figure 1 is a side elevational view of the device in which a portion has been shown in section, the device being shown as it appears in use, during rocking of the same between full and dotted line positions;

Figure 2 is an edge elevational view of the device, looking downwardly on the same as it appears in Figure 1; and Figure 3 is an enlarged transverse sectional view through the jaws.

Referring to the drawings in detail, designated generally at 10 is the fish hook remover, constituting the present invention. This is of scissors-like construction, so as to include a pair of elongated handles 14, 16 of rigid rod material terminating at their outer ends in laterally, outwardly directed, substantially closed handle loops 18, 20 respectively. Handles 14, 16, at their inner or forward ends merge into flattened connector portions 20, 22 respectively, disposed in superposed, face-contacting relation as shown in Figure 2. The connector portions 20, 22 at their forward ends have oppositely offset, crossing parts formed with registering openings receiving a rivet or other element 23 providing a pivotal connection of the connector portions to each other.

At their forward ends, the connector portions merge into shanks 24, 26 respectively which at their free, forward ends have jaws particularly shaped to effect the desired results. Thus, shank 26 is integrally formed at its forward end with a jaw 28 having a solid, thickened back part to impart the desired strength and rigidity thereto, and having a face part formed with a deep longitudinal groove 30 adapted to receive the shank of a hook 12 that is to be extracted by means of the tool constituting the invention.

The provision of the end-to-end, deep longitudinal groove 30 defines thin side walls 32 on the opposite sides of jaw 28 (Figure 3), providing a guide for the clamping tip 34 integrally formed upon the forward end of the shank 24.

The clamping tip 34 is of circular cross section, being a gently, longitudinally curved extension of the shank 24 as seen in Figure 1. At its free forward end, tip 34 projects a substantial distance beyond the jaw 28, and is tapered and smoothly rounded off as at 36, so as to prevent damage to the tissues of the fish when the tool is inserted in the fish's mouth.

It will thus be seen that when the handles 14, 16 are swung toward each other, tip 34 moves into the groove 30, shifting in a transverse direction toward the bottom of the groove, which is transversely curved complementarily to the adjacent surface of the tip 34. Further, the bottom of the groove is longitudinally curved complementarily to a curvature of the adjacent surface of the tip 34 (see Figure 1).

By reason of this construction, there is defined between tip 34 and the bottom of groove 30 a clamping space 38 of crescent-shaped cross section as seen in Figure 3, in which the shank of hook 12 will be tightly clamped. It is not essential that the hook be centered in said space in the manner shown in Figure 3. Rather, if the hook should slip to one or the other side of the groove, it will still be effectively clamped between the confronting surfaces of the jaw 28 and clamping tip 34.

In use of the device, and assuming that the hook 12 is deeply embedded in a fish's mouth, the tool, entirely outside of the fish, is gently closed upon the leader or fish line 40. The jaw 28 and tip 34 are not closed sufficiently, at this time, to clamp the line 40. Rather, the jaws are left apart just enough to retain the line between the jaw and tip, while permitting the jaw and tip to travel freely along the line, into the fish's mouth, to follow the line within the fish and be guided directly onto the shank of the hook 12.

It is important to note, from Figure 3, that the transverse dimension of the tip 34 is equal to the width of the groove 30, so as to cause the tip 34 to be in contact, at diametrically opposite locations thereon, with the opposite walls 32. This prevents the line 40 from slipping out of the space 38, even when the line is not clamped between the jaws.

In any event, the tool as previously noted is moved along the line, and eventually will be guided directly onto the shank of the hook, the shank entering the space 38 responsive merely to forward movement of the device within the fish along the fish line or leader 40. As soon as the shank is disposed in the space 38, and the forward movement of the device is in effect halted by reason of the fact that the jaws have arrived at the location at which the hook is embedded in the tissues of the fish, the handles 14, 16 are pressed together to a further extent.

This causes the jaws to tightly clamp the hook shank between them. Now, one merely manipulates the tool as necessary for the purpose of dislodging the hook. One can thus rock the tool transversely, shifting it back and forth in a longitudinal direction, as shown in full and dotted lines in Figure 1, or otherwise manipulate the device until the hook pulls free. Then, the device is pulled out of the fish's mouth with the hook still clamped between the jaws.

It is seen that the device is thus capable of manufacture at a very low cost, while at the same time still being quite rugged and adapted for efficient employment despite varying sizes or types of fish hooks.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A fish hook extractor comprising a pair of handles; connecting portions integral with said handles and disposed in crossing relation; means pivotally connecting the connecting portions; shanks integral with the connecting portions, so as to move said shanks toward and away from each other responsive to movement of the handles toward and away from each other, respectively; and jaws formed upon the respective shanks, one of said jaws being formed with a deep longitudinal groove open at its opposite ends so as to receive a fish line, for guiding of the jaws along said fish line into a fish's mouth into position to receive the shank of a fish hook, the other jaw being formed as a longitudinal extension of the other shank, said longitudinal extension being movable into the groove to define between the jaws a space within which the fish hook shank may be clamped, said extension being of circular cross section, the bottom of said groove being transversely depressed complementarily to the cross sectional shape of the adjacent face of the extension, defining a substantially crescent-shaped space within which the fish hook shank will be clamped, said extension being longitudinally curved and the bottom of the groove having a longitudinal curvature complementing that of the extension so as to slightly, springably deform the shank of the fish hook when said hook shank is clamped between the jaws, with the fish hook shank being formed to a longitudinal curvature corresponding to that of the extension, thereby to hold the shank against slippage in a longitudinal direction relative to the jaws during manipulation of the fish hook shank for the purpose of dislodging the same.

References Cited in the file of this patent

UNITED STATES PATENTS

| | | |
|---|---|---|
| 479,959 | Stanley | Aug. 2, 1892 |
| 649,939 | Leighton et al. | May 22, 1900 |
| 777,021 | Hansen | Dec. 6, 1904 |
| 2,294,758 | Manske | Sept. 1, 1942 |
| 2,531,522 | Malouf | Nov. 28, 1950 |
| 2,779,123 | White | Jan. 29, 1957 |